2,876,158

United States Patent Office
Patented Mar. 3, 1959

2,876,158

DI-(4-AMIDINOPHENYL)-TRIAZENE-(N-1.3) COMPOSITIONS STABILIZED WITH PYRAZOLONE DERIVATIVES

Leonhard Middendorf, Frankfurt am Main, and Heinz Loewe, Kelkheim (Taunus), Germany, assignors to Farbwerke Hoechst Aktiengesellschaft vormals Meister Lucius & Brüning, Frankfurt am Main, Germany, a corporation of Germany No Drawing. Application April 15, 1917
Serial No. 652,703

Claims priority, application Germany August 3, 1956

4 Claims. (Cl. 167—53)

The present invention relates to new compositions of matter. Di - (4 - amidinophenyl) - triazene - (N - 1.3) is known in veterinary medicine as a very effective chemotherapeutic against infections caused by trypanosomes and babesia. To improve the use of this remedy it has been suggested to apply it not only in the form of the water-soluble salts of this base such as the diacetate, dilactate or digluconate but also and especially in the form of salts with acylated amino-acids, e. g. the diaceturate. They are administered intramuscularly in the form of aqueous solutions. Such aqueous solutions are stable, however, for a short time only.

Now we have found that aqueous solutions of water-soluble salts of di-(4-amidinophenyl)-triazene-(N-1.3) whose curative effect and tolerability remain unchanged but whose stability is considerably improved, are obtained by adding to the solutions easily water-soluble pyrazolone derivatives as stabilizers in the ratio of 1 part by weight of the triazene derivative to 1–10 parts by weight of the pyrazolone derivative.

As easily water-soluble pyrazolone derivatives there may especially be used phenylpyrazolones substituted by two or three methyl groups in the pyrazolone ring. There may be mentioned e. g.: 1.2-dimethyl-3-phenyl-pyrazolone - (5), 1 - phenyl - 2.3 - dimethyl - pyrazolone - (5), 1 - phenyl - 2.5 - dimethyl - pyrazolone - (3), 1 - phenyl - 2.3.4 - trimethyl - pyrazolone - (5), or 1.2.4-trimethyl-3-phenyl-pyrazolone-(5).

It is possible to manufacture the stable solutions according to the process of the present invention, by e. g. dissolving water-soluble salts of di-(4-amidinophenyl)-triazene-(N-1.3) in aqueous solutions of easily water-soluble pyrazolone derivatives. It is also possible to dissolve the water-soluble salts of di-(4-amidinophenyl)-triazene-(N-1.3) in water together with easily soluble pyrazolone derivatives. Thus solutions of water-soluble salts of di-(4-amidinophenyl)-triazene-(N-1.3) are obtained. The solutions are ready for application. When bottled in ampoules or vials they are stable for a year or more.

It is furthermore possible to manufacture dry mixtures of the water-soluble salts of di-(4-amidinophenyl)-triazene-(N-1.3) with easily water-soluble pyrazolone derivatives and to dissolve the mixtures in water. Finally it is possible to granulate these mixtures or to form them into tablets prior to dissolution. Apart from the stabilizing effect owing to the addition of water-soluble pyrazolone derivatives this manner of operating involves the technical advantages consisting of the fact that the dry mixtures consisting of water-soluble salts of di-(4-amidinophenyl)-triazene-(N-1.3) and the easily water-soluble pyrazolone derivatives can easily be trickled and that consequently they can be dosed more easily and more accurately. The said dry mixtures can well be worked into tablets. Thus it is possible to transform them, without further additions, into so-called "dissolution tablets" this form being of special advantage for practitioners who wish to prepare accurately dosed solutions themselves.

A further advantage connected with the addition of easily water-soluble pyrazolone derivatives is that the time of dissolution of the water-soluble salts of di-(4-amidinophenyl)-triazene-(N-1.3) is accelerated.

The following examples illustrate the invention. The parts are by weight unless otherwise stated.

Example 1

50 g. of di-(4-amidinophenyl)-triazene-(N-1.3)-digluconate are dissolved in 970 cc. of an aqueous solution of 1-phenyl-2.3-dimethyl-pyrazolone-(5), the concentration of the latter substance being 35 g. per 100 cc. of water, so as to yield one liter of solution. This aqueous solution is filtered and then bottled into ampoules while being fumigated with nitrogen.

After having been stored for one year at room temperature the solution proved to be practically unchanged whereas a solution of 50 g. of di-(4-amidinophenyl)-triazene-(N-1.3)-digluconate in one liter of distilled water was visibly decomposed after having been stored for several weeks while it was largely decomposed after several months although the solution had been prepared and bottled under the same conditions as cited above.

Example 2

100 parts by weight of di-(4-amidinophenyl)-triazene-(N-1.3)-dilactate are homogeneously mixed in a ball mill with 300 parts by weight of 1.2-dimethyl-3-phenyl-pyrazolone-(5). The mixture is briquetted on a tablet press. By disintegrating and sieving the briquettes are transformed into a granulate of equal grain size. From the granulate which is easily soluble and yields clear solutions aqueous solutions are prepared which are ready for application. These solutions are stable for a longer time than aqueous solutions containing the same concentration of di-(4-amidinophenyl)-triazene-(N-1.3)-dilactate but to which 1.2-dimethyl-3-phenyl-pyrazolone-(5) had not been added.

Example 3

100 parts by weight of di-(4-amidinophenyl)-triazene-(N-1.3)-diaceturate are homogeneously mixed in a ball mill with 200 parts by weight of 1-phenyl-2.3-dimethyl-pyrazolone-(5). The mixture is formed into tablets without further admixtures. From the tablets which are easily soluble and yield clear solutions aqueous solutions are prepared which are ready for application. They are stable for a longer time than aqueous solutions containing the same concentration of di-(4-amidinophenyl) triazene-(N-1.3)-diaceturate but to which no 1-phenyl-2.3-dimethyl-pyrazolone-(5) had been added.

We claim:

1. A composition of matter comprising a water-soluble organic acid salt of di-(4-amidinophenyl)-triazene-(N-1.3) and a water-soluble methyl and phenyl-substituted pyrazolone as stabilizer, the ratio of the components being 1 part by weight of the triazene derivative to 1–10 parts by weight of the pyrazolone derivative.

2. A composition of matter comprising di-(4-amidinophenyl)-triazene-(N-1.3)-digluconate and 1-phenyl-2.3-dimethyl-pyrazolone-(5) in an aqueous solution, the ratio of the components being about 1 part by weight of the triazene derivative to about 7 parts by weight of the pyrazolone derivative.

3. A composition of matter comprising di-(4-amidinophenyl)-triazene-(N-1.3)-dilactate and 1.2-dimethyl-3-phenyl-pyrazolone-(5) in a dry mixture, the weight ratio of the components being about 1:3, said mixture being easily convertible into clear aqueous solutions of prolonged stability.

4. A composition of matter comprising di-(4-amidinophenyl)-triazene-(N-1.3)-diaceturate and 1-phenyl-2.3-dimethyl-pyrazolone-(5) in a dry mixture, the weight ratio of the components being about 1:2, said mixture being easily convertible into clear aqueous solutions of prolonged stability.

References Cited in the file of this patent

UNITED STATES PATENTS 2,673,197  Jensch _____ Mar. 23, 1954